United States Patent [19]
Knoll et al.

[11] Patent Number: 5,878,508
[45] Date of Patent: Mar. 9, 1999

[54] FOOD DEHYDRATOR

[75] Inventors: John L. Knoll, Minneapolis; Troy M. Iverson, Chaska; Jeffrey E. Sandahl, Howard Lake, all of Minn.; Bryce M. Lemon, Crystal Lake, Ill.; Joaquim da Rosa, Racine, Wis.; Chad S. Erickson, Plymouth, Minn.; David A. Dornbush, Prior Lake, Minn.; Richard P. Riedel, Brooklyn Park, Minn.

[73] Assignee: American Harvest, Inc., Chaska, Minn.

[21] Appl. No.: 781,719

[22] Filed: Jan. 10, 1997

[51] Int. Cl.$^6$ .................................................... F26B 11/18
[52] U.S. Cl. ................................. 34/488; 34/197; 34/211
[58] Field of Search ............................. 34/196, 197, 211, 34/238, 488; 99/467, 483; 219/385, 386, 387, 400

[56] References Cited

U.S. PATENT DOCUMENTS

| | | | |
|---|---|---|---|
| D. 261,142 | 10/1981 | Erickson et al. | D15/110 |
| 4,190,965 | 3/1980 | Erickson | 34/196 |
| 4,192,081 | 3/1980 | Erickson et al. | 34/225 |
| 4,224,743 | 9/1980 | Erickson et al. | 34/219 |
| 4,237,623 | 12/1980 | Timm et al. | 34/196 |
| 4,531,306 | 7/1985 | Erickson | 34/44 |
| 4,536,643 | 8/1985 | Erickson | 219/400 |
| 4,750,276 | 6/1988 | Smith et al. | 34/197 X |
| 4,779,604 | 10/1988 | König | 34/197 X |
| 5,215,004 | 6/1993 | Su | 99/483 |
| 5,235,906 | 8/1993 | Hsu | 99/483 |
| 5,261,168 | 11/1993 | Li | 34/197 |
| 5,311,673 | 5/1994 | Su | 34/197 |
| 5,379,527 | 1/1995 | Su | 34/197 |
| 5,420,393 | 5/1995 | Dornbush et al. | 219/400 |
| 5,423,249 | 6/1995 | Meyer | 99/483 |
| 5,437,108 | 8/1995 | Alseth | 34/196 |
| 5,454,298 | 10/1995 | Lu | 99/483 |
| 5,458,050 | 10/1995 | Su | 99/340 |
| 5,502,900 | 4/1996 | Hui | 34/238 X |

FOREIGN PATENT DOCUMENTS

WO 95/19112  7/1995  WIPO .............................. A23L 3/16

OTHER PUBLICATIONS

"Healthy Food Dryer", *Sunbeam*, Instruction Booklet, 19 pgs. © 1994.
"We've got the deals and the advice on the best appliances", *RetraVision*, Advertisement, p. 24. Jan. 1995.

Primary Examiner—Henry A. Bennett
Assistant Examiner—Steve Gravini
Attorney, Agent, or Firm—Godfrey & Kahn, S.C.

[57] ABSTRACT

A modular food dehydrator utilizing a heater blower assembly located on a top surface of a dehydrator module. The heater blower assembly includes a motor driven fan, a heating element and an air distribution portion for directing heated air across the support surfaces. The heater blower assembly is preferably releasably attachable to the dehydrator module. In a first embodiment, the dehydrator module has a central opening extending generally vertically through the support surfaces in fluid communication with the heater blower assembly for directing heated air radially outward across the plurality of support surfaces. The dehydrator module preferably includes outlet vents on an outer perimeter surface for exhausting the heated air. At least one outlet vent is preferably located between each of the plurality of support surfaces. In a second embodiment, the dehydrator module includes air ducts on an outer perimeter surface in fluid communication with the heater blower assembly for directing pressurized, heated air radially inward across the plurality of support surfaces. The dehydrator module includes a central opening extending generally vertically through the support surfaces in fluid communication with a space between each the support surfaces for exhausting or recirculating heated air.

26 Claims, 19 Drawing Sheets

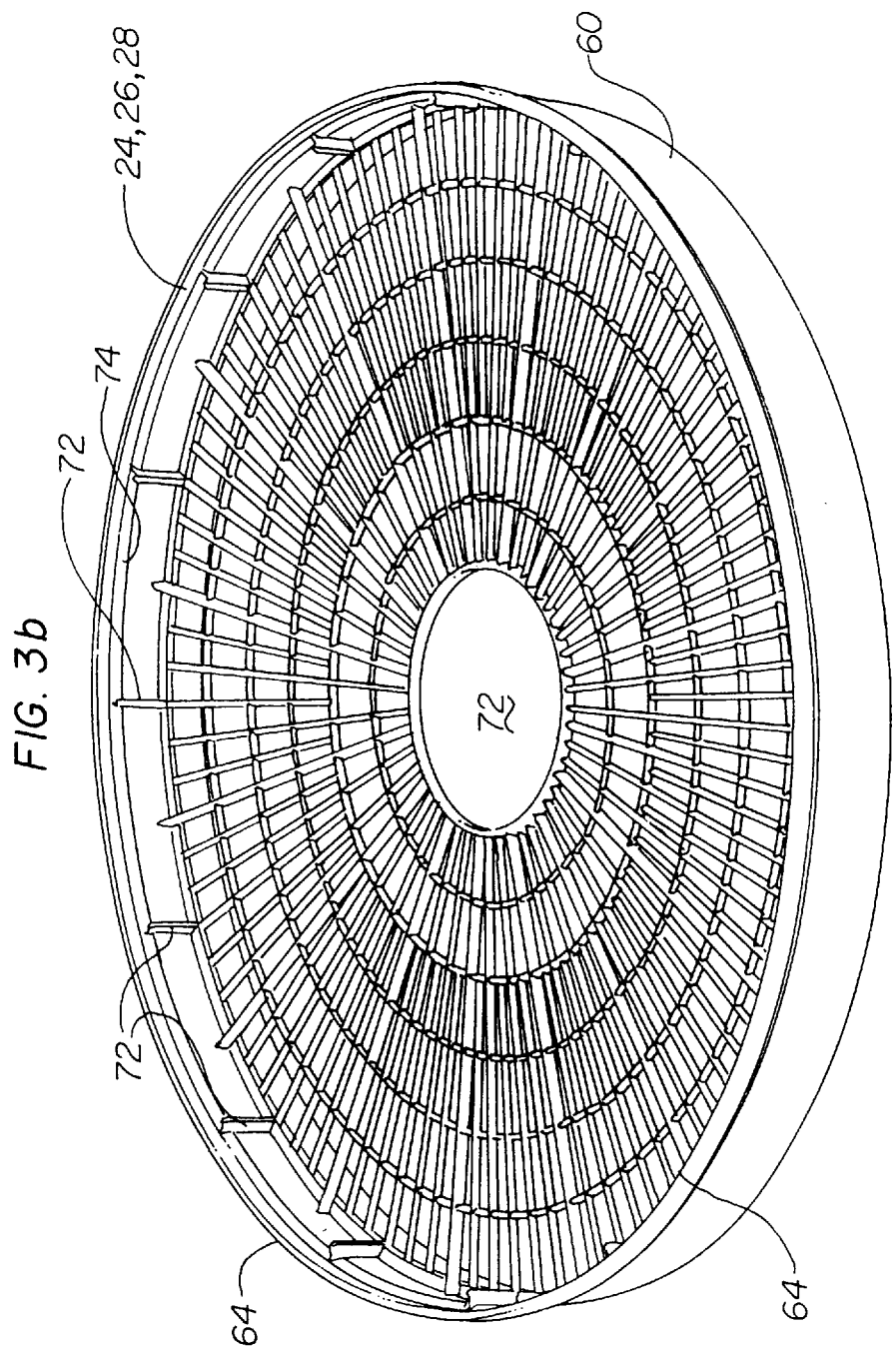

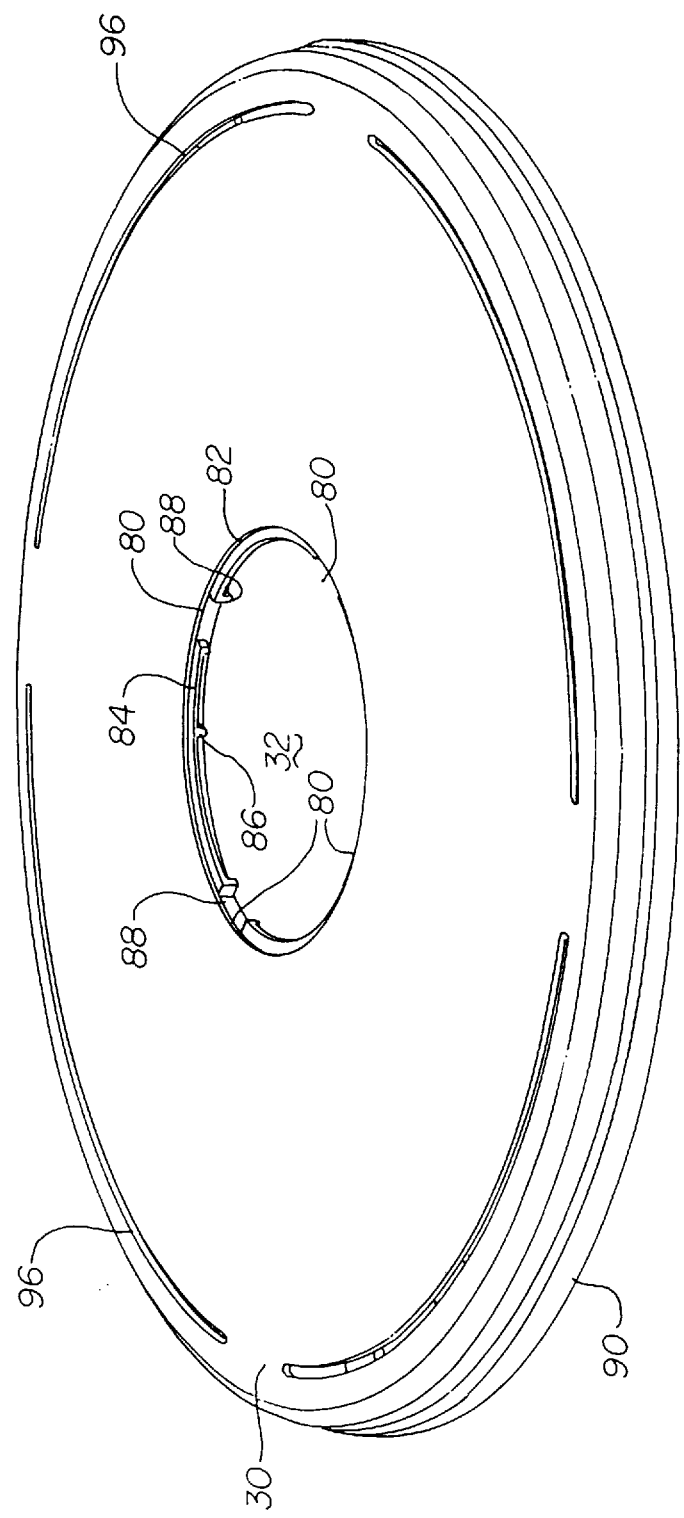

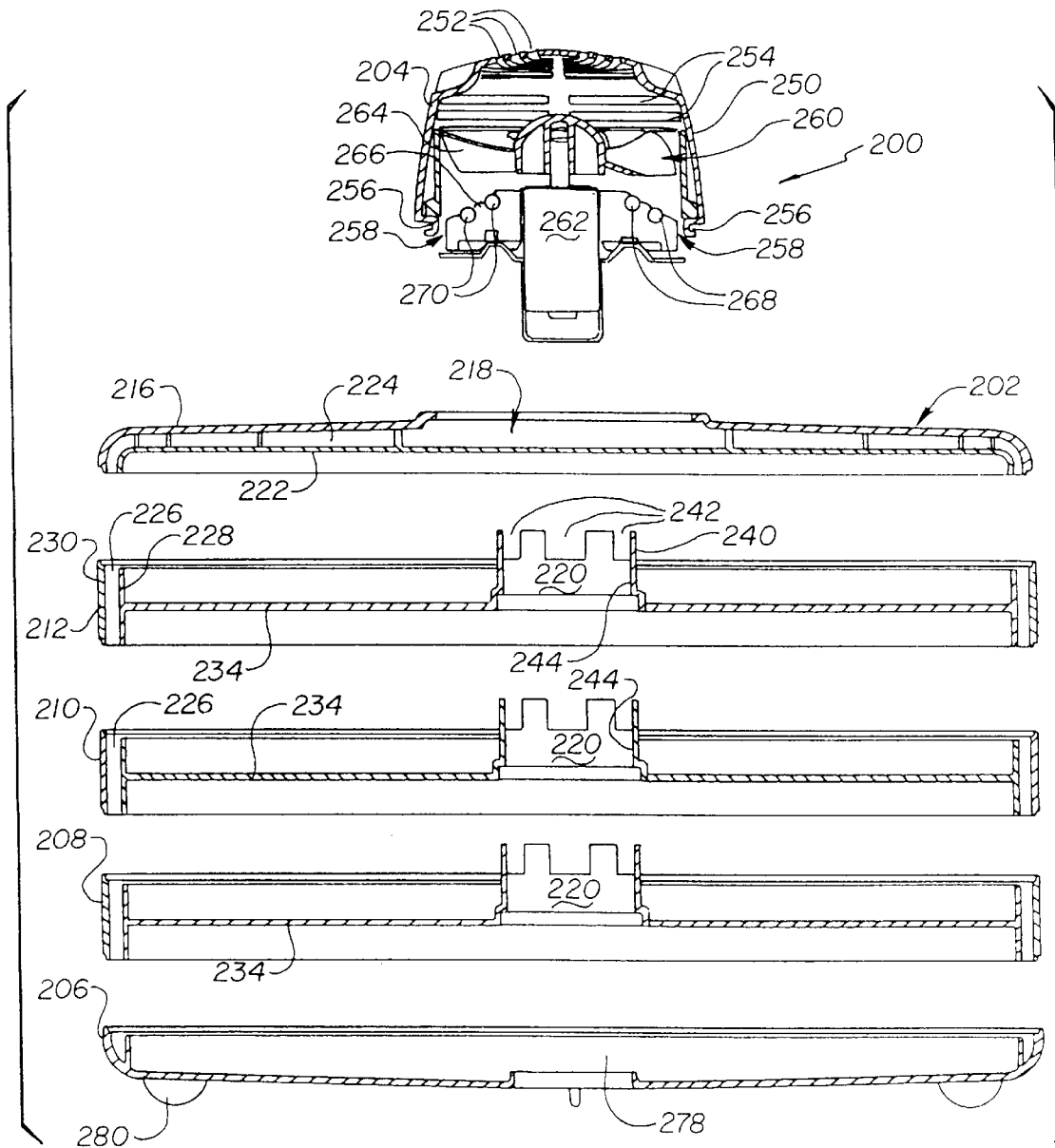

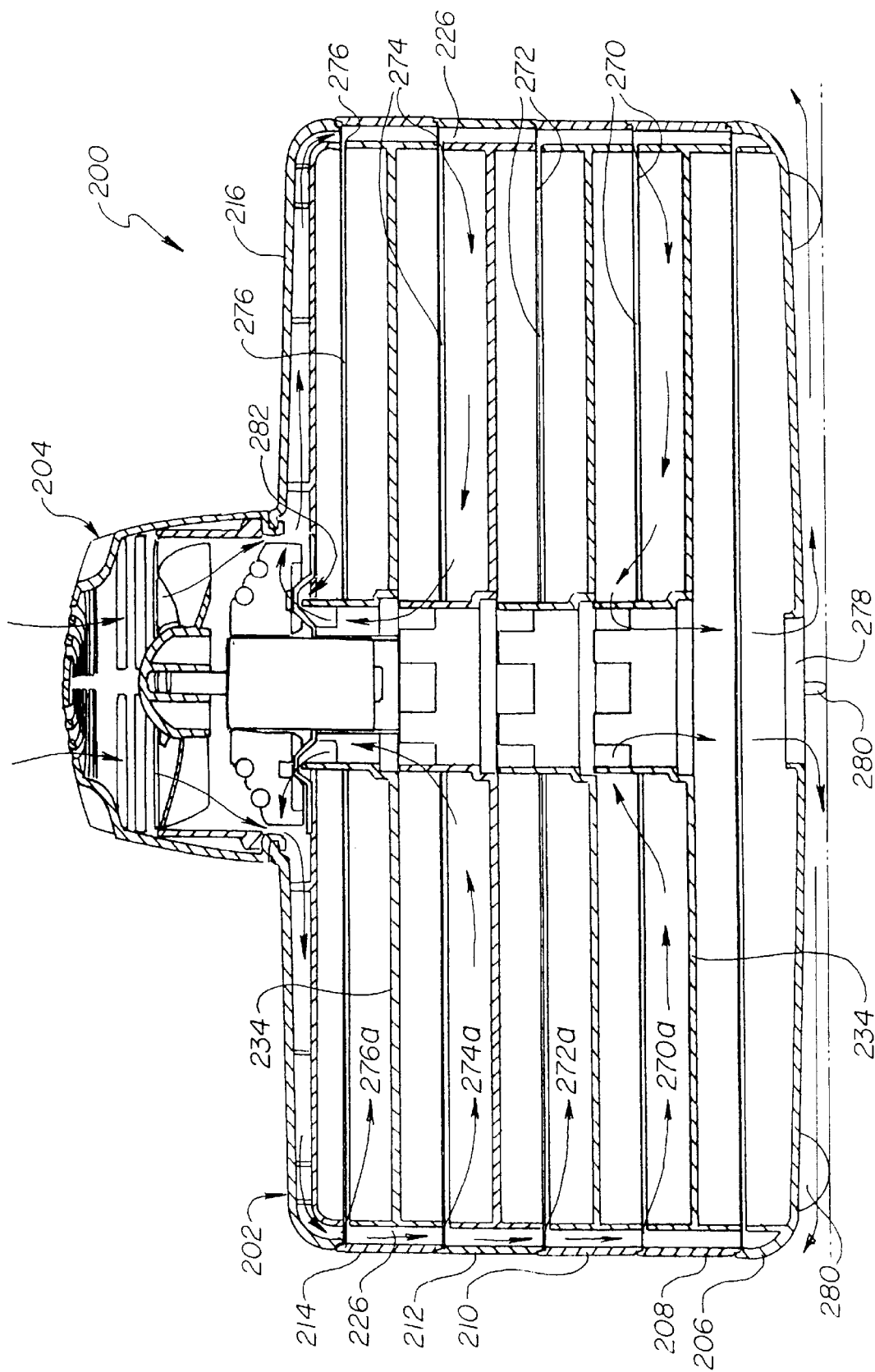

FOOD DEHYDRATOR

FIELD OF THE INVENTION

The present invention relates to a modular food dehydrator with a top mounted heater blower assembly.

BACKGROUND OF THE INVENTION

The preservation of food by dehydration is well known in the art. The early dehydration of food was typically carried out by placing the food product in an open container exposed to the air and to the sun. In more recent times, mechanical food dehydrators save been developed for use in the home. These food dehydrators typically include plurality of shelves contained within a cabinet after which the food to be dried is placed. The dehydrator typically uses a motor driven fan to draw air through openings and circulate the air throughout the dehydrator. A heater is typically provided for heating the air before it is circulated by the fan, such as disclosed in U.S. Pat. No. 5,458,050 (Su).

A significant number of current food dehydrators locate the heater element and blower fan in the base. The heated air moves vertically through a series of perforated trays. The air is warmest and driest at the first tray, and becomes progressively cooler and more humid as it reaches the later trays. Therefore, the food on the trays closest to the hot air source get very dry, while that furthest from the source dries more slowly. Directing the heated air vertically through a series of trays results in uneven drying.

Locating the heating element and blower motor in the base also creates cleaning problems. These bases are typically not dishwasher safe. Additionally, the base can become contaminated with drippings that fall through the perforations in the trays. If meat products are dried, the grease drippings may create a fire hazard.

Many food dehydrators require the heated air to travel through various ducts before reaching the food. The ducts typically have multiple bends that result in velocity loss and heat dissipation before the heated air reaches the food. Consequently, more powerful heating elements and blower fans are typically used to compensate for the convoluted air flow paths through the dehydrator. Finally, most current dehydrators are large and bulky creating difficulties with use and storage in the home.

SUMMARY OF THE INVENTION

The present invention relates to a modular food dehydrator utilizing a heater blower assembly located on a top surface of a dehydrator module. The heater blower assembly includes a motor driven fan, a heating element and an air distribution portion for directing heated air across the support surfaces. The heater blower assembly is preferably releasably attachable to the dehydrator module.

In a first embodiment, the dehydrator module has a central opening extending generally vertically through the support surfaces in fluid communication with the heater blower assembly for directing pressurized, heated air radially outward across the plurality of support surfaces. The dehydrator module preferably includes outlet vents on an outer perimeter surface for exhausting the heated air. At least one outlet vent is preferably located between each of the plurality of support surfaces.

In a second embodiment, the dehydrator module includes air ducts on an outer perimeter surface in fluid communication with the heater blower assembly for directing heated air radially inward across the plurality of support surfaces. The dehydrator module includes a central opening extending generally vertically through the support surfaces in fluid communication with a space between each the support surfaces for exhausting heated air. A portion of the heated air may be recirculated.

The first embodiment of the food dehydrator includes a heater blower assembly comprising a motor driven fan and heating elements located in a housing. The housing has air inlet vents on a central portion through which outside air can be drawn toward the heating element. The housing also includes blower ports located on an air distribution portion through which pressurized, heated air can be directed. The dehydrator module includes a base, at least one food tray and a cover. The food tray has a support surface with a central opening for receiving the air distribution portion. The food tray capable of stacking vertically with the base so that an outlet vent is formed between the base and the food tray when in a stacked configuration. The cover is capable of stacking vertically with the food tray. The cover also has a central opening for receiving the air distribution portion. The air distribution portion extends downward through the central openings in the cover and the food tray in an engaged configuration so that the blower ports are positioned to direct heated air axially outward across the support surface of the food tray. At least a portion of the heated air is exhausted to the atmosphere through the outlet vent.

The heater blower assembly may be detachable or permanently attached to the dehydrator module. Various mechanisms are available for releasably securing the heater blower assembly to the dehydrator module. The air distribution portion preferably includes first blower ports for directing heated air axially outward across a floor of the base and across a bottom surface of the support surface and second blower ports for directing heated air axially outward across a top surface of the support surface. A flow diverter may optionally be located below the first blower ports. The support surface is preferably an open mesh structure so that heated air will contact the top and bottom of the food items. Alternatively, the support structure may be solid for drying liquids or semi-liquid food items.

Outlet vents may be located on the cover or in a gap formed between the cover and the top food tray. The cover may include a side wall having a flared bottom edge. Spaced supports may optionally be located along an inside perimeter of the flared bottom edge. The spaced supports are capable of forming a gap between a top edge of the food tray and the flared bottom edge when in a stacked configuration. The food trays include a corresponding flared bottom edge with the spaced supports. The spaced supports are capable of forming a gap between a top edge of an adjacent food tray and the flared bottom edge when in a stacked configuration. Consequently, a plurality of food trays may be stacked, forming outlet vents therebetween. The components of the dehydrator module are preferably dishwasher safe and immersible in water.

The present invention is also directed to a kit for assembling a food dehydrator having at least two food trays.

The present invention is also directed to a method of operating a food dehydrator. The method includes vertically stacking at least one food tray and a cover onto a base so that an outlet vent is formed between the base and the food tray and adjacent food trays. The air distribution portion of the heater blower assembly is inserted downward through a central openings in the cover and a support surface(s) of the food tray. Outside air is draw in through the air inlet vents to the heating element and pressurized, heated air is directed through the blower ports axially outward across the support surface of the food tray. At least a portion of the heated air is vented to the atmosphere through the outlet vent.

In the first embodiment, locating the heater blower module close to the center food trays provides for the shortest path to the food and minimizes loss in air velocity and heat. Heat generated by the motor is also retained within the dehydrator module. There is only one right angle bend in the air flow before the heated air reaches the food, minimizing velocity losses. Substantially all of the heated air comes directly from the dehydrator module, rather than from neighboring trays, minimizing differences in air temperature and humidity from tray to tray.

In the second embodiment, recirculating a portion of the heated air conserves energy, since the air is already heated, although the air also has a higher moisture content. Supplying the heated air from the outer perimeter of the food trays insures that the warmest and driest air encounters the larger surface area of the support surfaces at the perimeter of the food trays. The air cools and absorbs moisture as it moves radially inward. However, the velocity of the heated air increases as it move radially inward, compensating in large part, for the increase moisture content and lower temperature of the air.

With regard to both the first and second embodiments of the food dehydrators, the total path length the air travels from the heater coils to the food trays, until it is exhausted through the outlet vents, is preferably about the same from tray to tray contributing to uniform heating. Moving the heated air flow horizontally over the food, rather than vertically through the trays, also provides for more uniform drying of food items from tray to tray. The horizontal air flow also permits drying of liquid or semi-liquid materials on a solid or a non-porous support surfaces with no blockage of air movement. The symmetrical nature of the dehydrator modules also contributes to even distribution of heated air and more even drying of the food. A detachable nature of the detachable heater blower assemblies allows for easy storage of the food dehydrators. It is anticipated that the relatively compact, detachable heater blower assemblies will be stored along with other kitchen appliances, while the more robust and bulkier trays can be stored in another area without concern over dirt and moisture. Once the detachable heater blower assemblies are removed from the dehydrator modules all remaining components are dishwasher safe and can be fully immersed in water.

BRIEF DESCRIPTION OF THE SEVERAL VIEWS OF THE DRAWINGS

FIG. 2b is a top prospective view of the base of FIG. 2a.

FIG. 3b is a bottom prospective view of the food tray of FIG. 3a.

FIG. 4a is a top prospective view of a cover for the present food dehydrator.

FIG. 4b is a bottom prospective view of the cover of FIG. 4a.

FIG. 9 is an exploded side sectional view of an alternate food dehydrator.

FIG. 10 is a side sectional view of the food dehydrator of FIG. 9 with an additional food tray.

DETAILED DESCRIPTION OF THE INVENTION

Figure 1A:
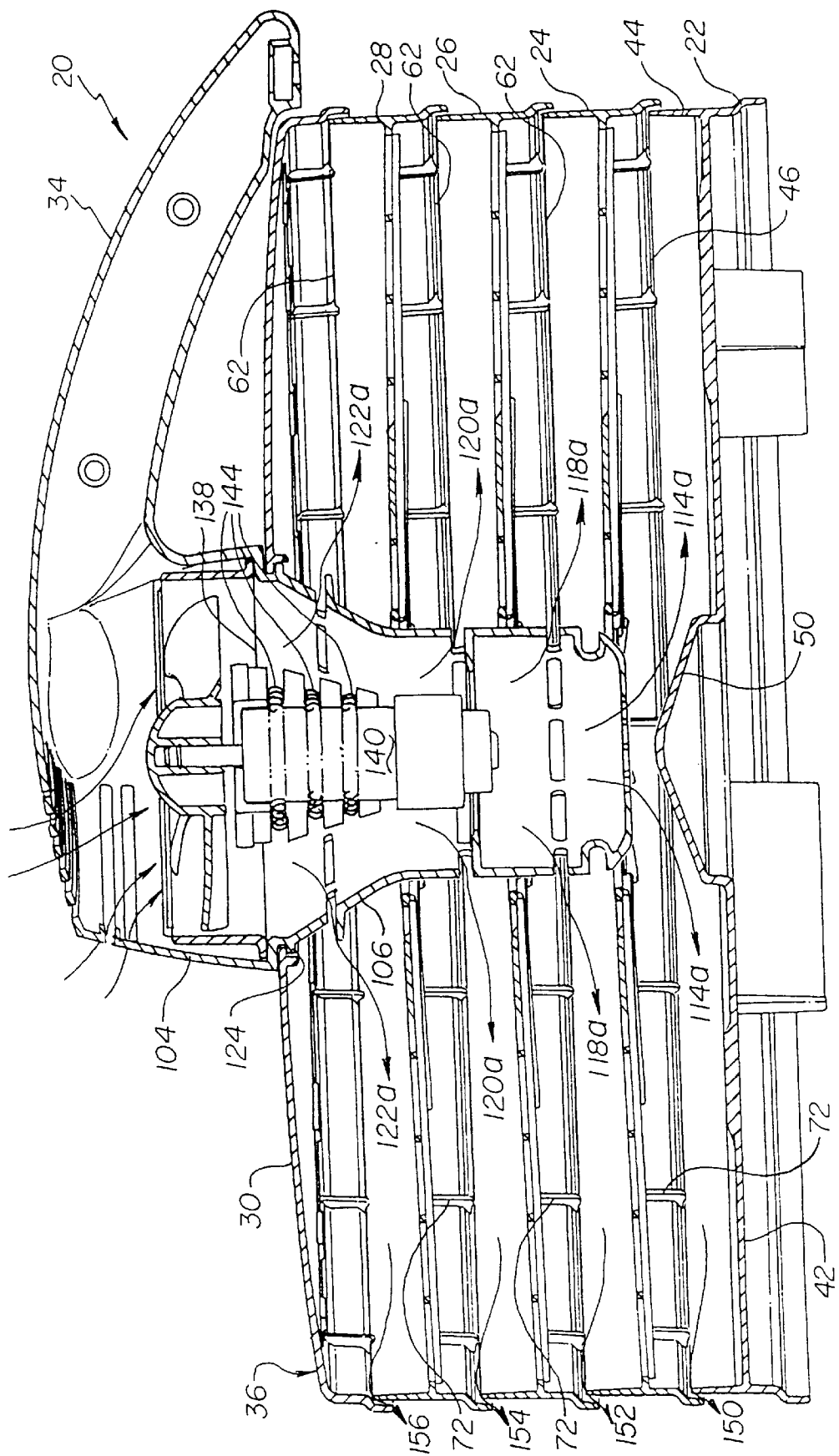
FIG. 1a is a sectional side view of the present food dehydrator with the heater blower assembly in the engaged configuration.
Figure 1B:
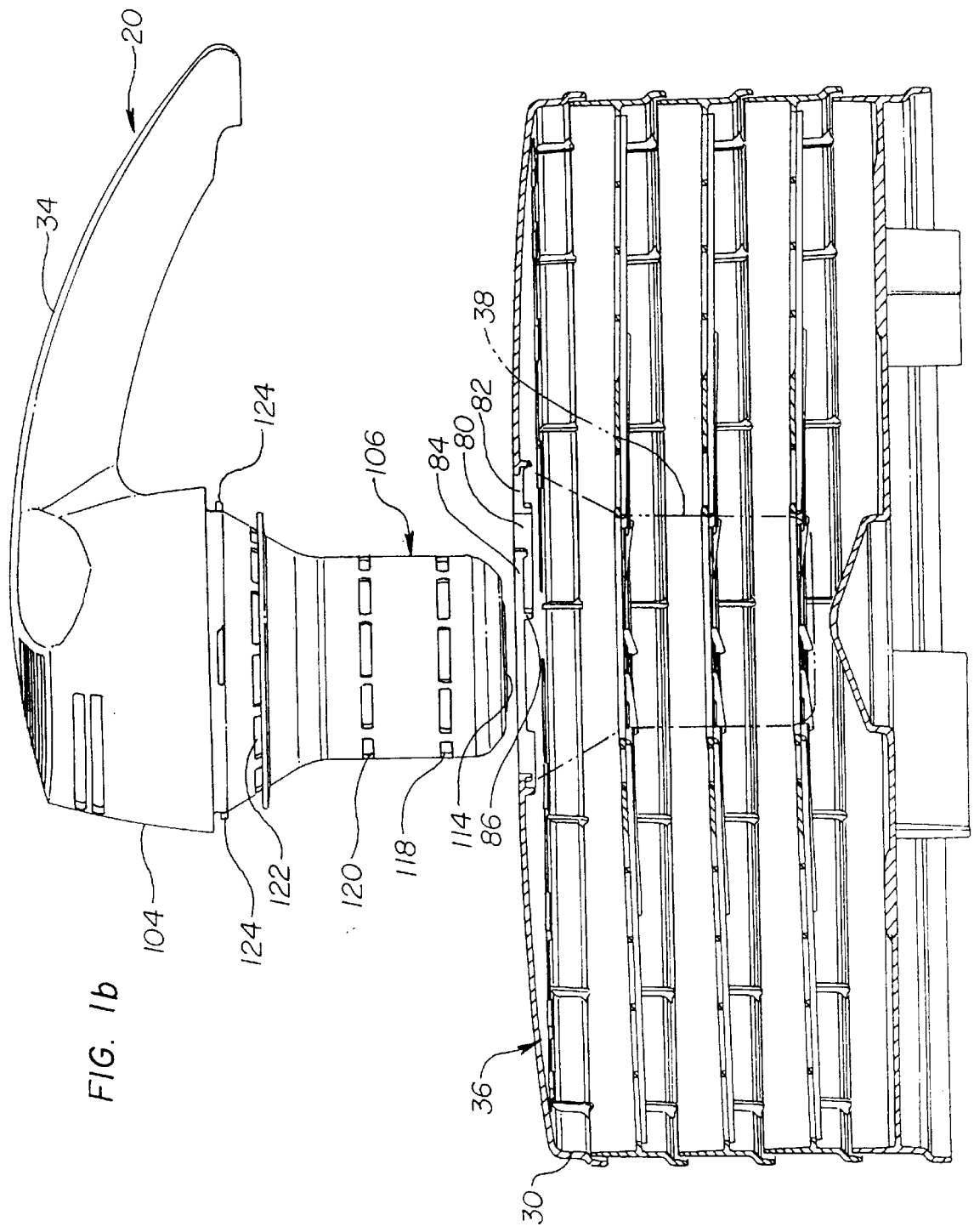
FIG. 1b is a sectional side view of the present food dehydrator with the heater blower assembly in the disengaged configuration.

FIGS. 1a and 1b are side sectional views of the preferred food dehydrator 20 of the present invention. The food dehydrator 20 includes a dehydrator module 36 and a detachable heater blower assembly 34. The dehydrator module 36 includes a base 22 on which may be stacked a series of food trays 24, 26, and 28. A cover 30 extends across the top of the food tray 28. The detachable heater blower assembly 34 extends downward through a central opening 32 in the cover 30 (see FIG. 4a) and central openings 72 in the food trays 24–28 into a central cavity 38 (see dashed lines in FIG. 1b). In an alternate embodiment, the heater blower assembly 34 is permanently attached to the dehydrator module 36. The base 22 and food trays 24–28 may be molded from a suitable thermoplastic material, such as acrylonitrile butadiene styrene (ABS), styrene-acrylonitrile resin (SAN), or styrene.

Figure 2A:
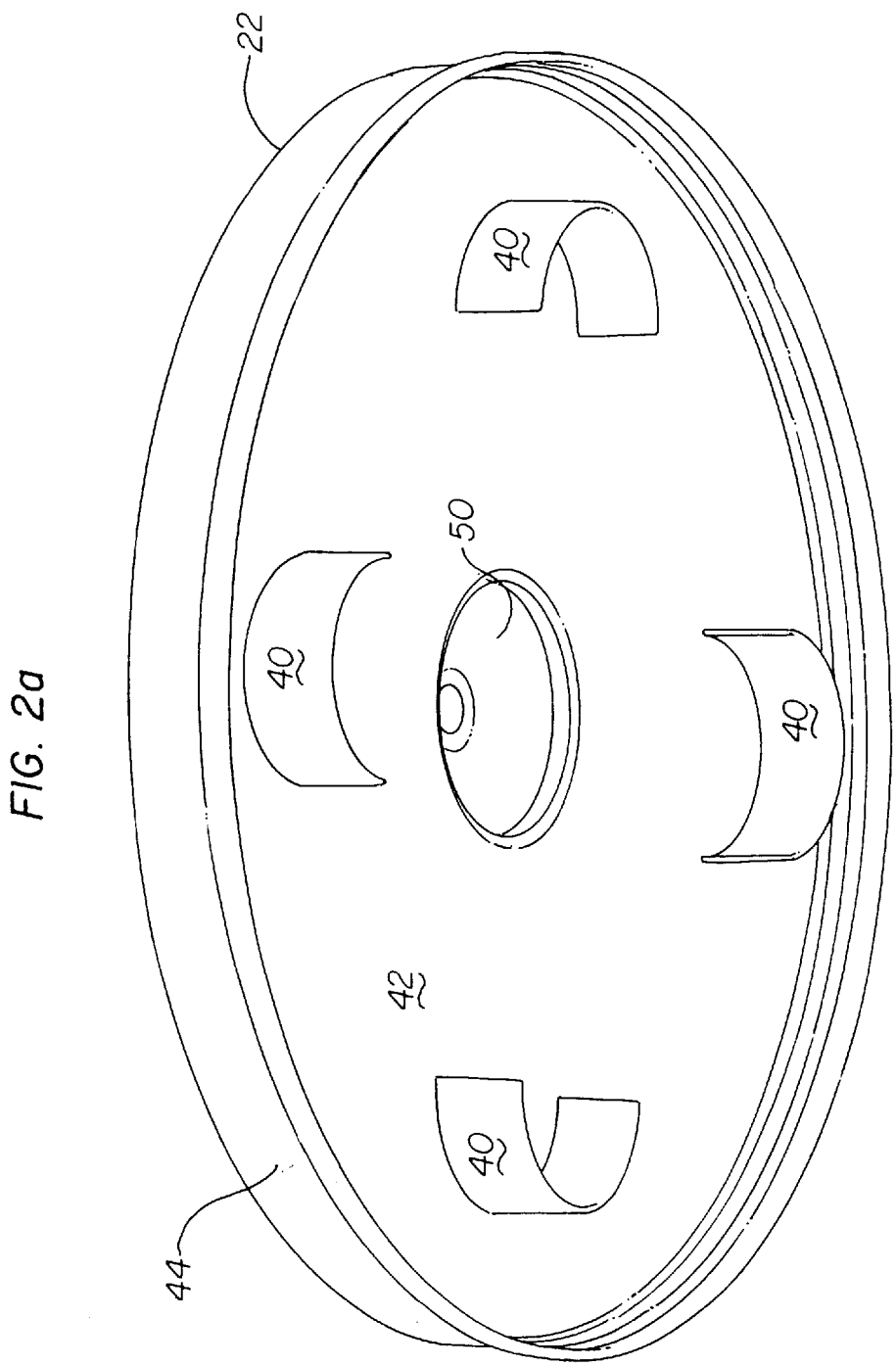
FIG. 2a is a bottom prospective view of the base for the present food dehydrator.
Figure 2B:
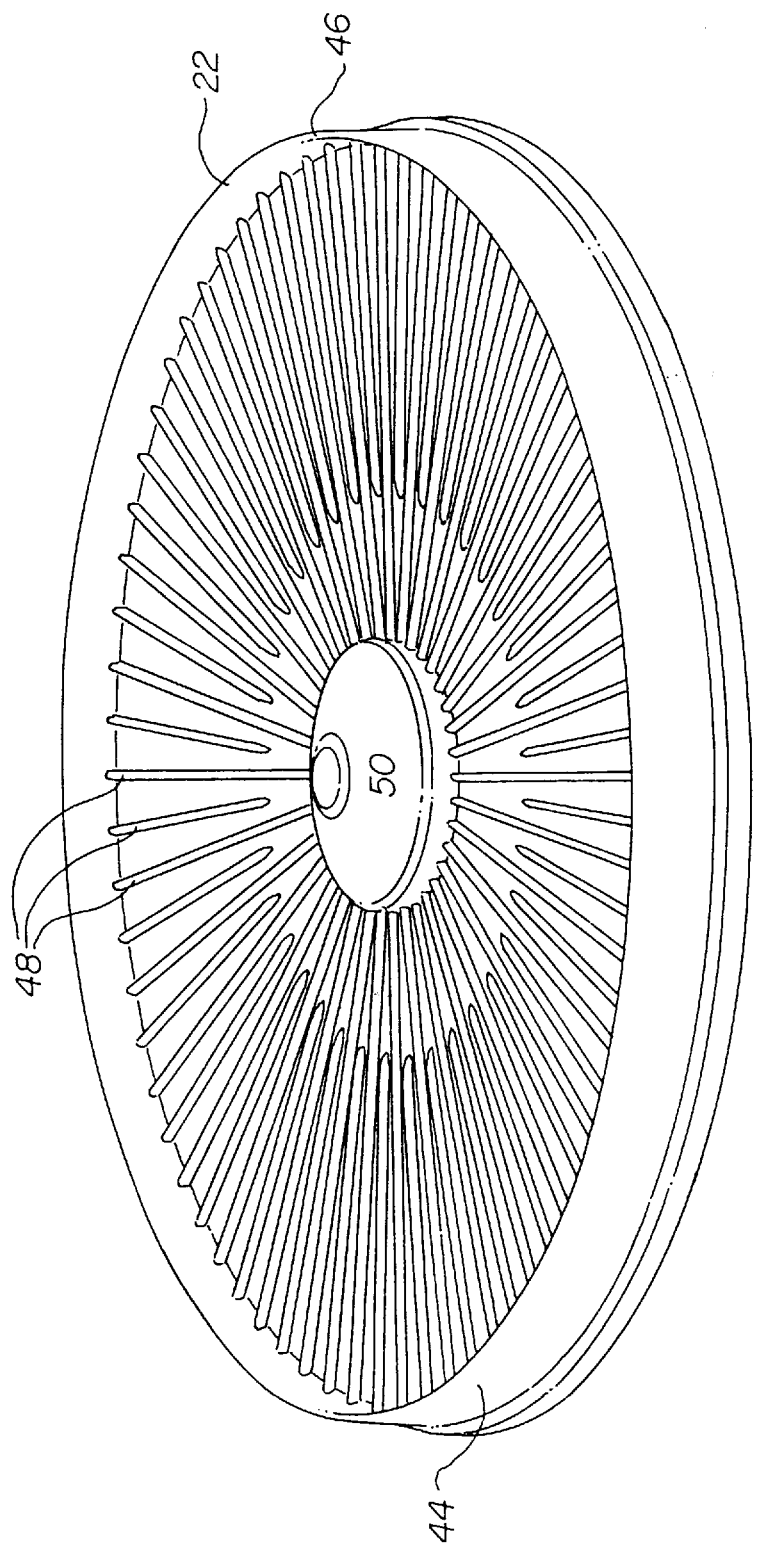

FIGS. 2a and 2b are bottom and top prospective views of the base 22, respectively. The bottom of the base 22 includes a series of legs 40 attached to a lower surface of a floor 42. Sidewall 44 extends around the perimeter of the floor 42. The sidewall 44 includes a top edge 46 that engages with a flared bottom edge 64 of the food tray 24 (see FIGS. 3A and 3B). A top surface of the floor 42 includes a series of radial support members 48 so that heated air can flow freely below food to be dehydrated. The radial support members 48 also allows drippings from the food items to be collected on the floor 42 of the base 22 without contaminating food items located thereon. Consequently, the base 22 can serve as an additional food tray. A flow diverter 50 is located in the center of the floor 42 for directing the heated air horizontally across the base 22.

Figure 3A:
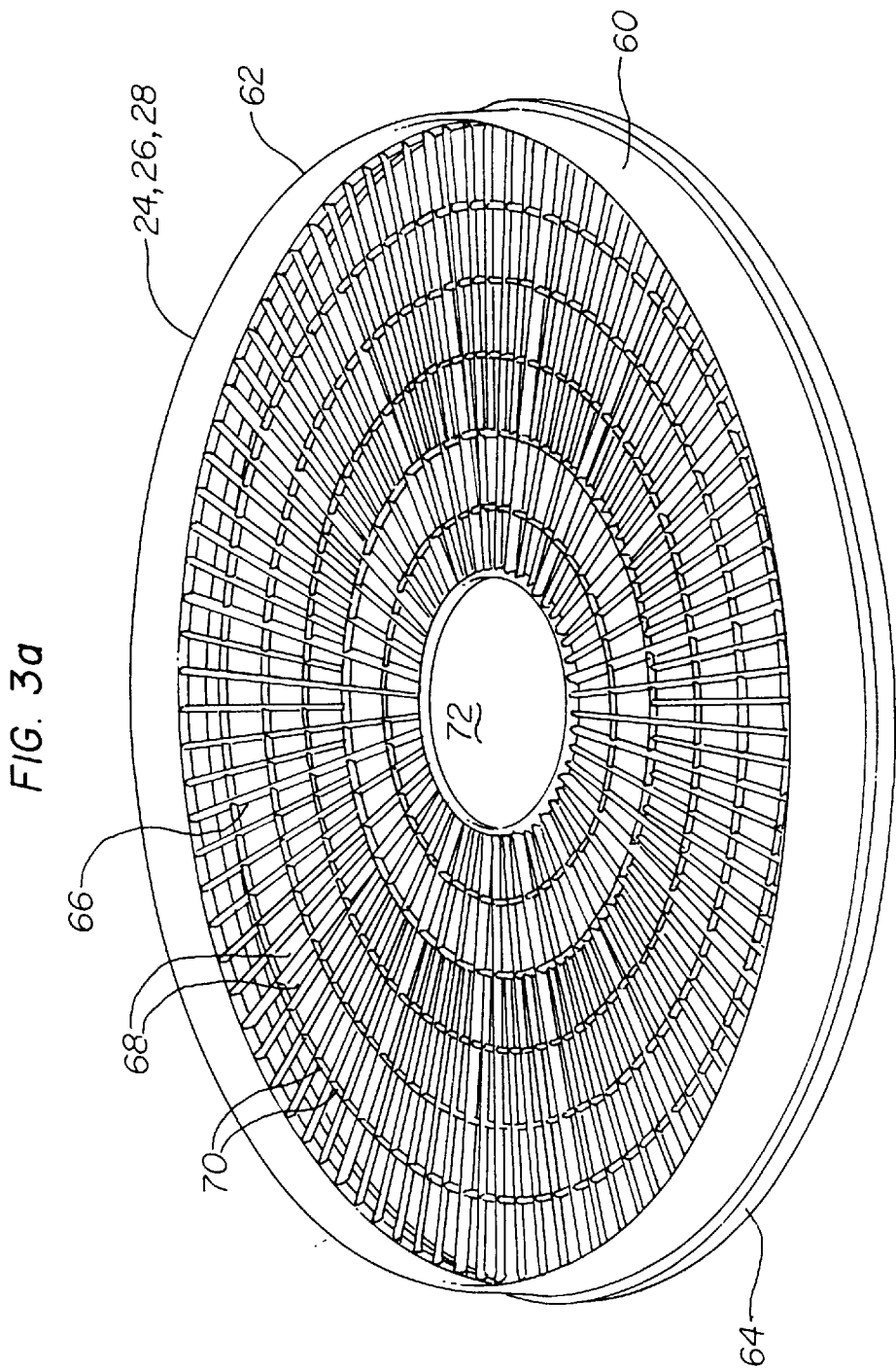
FIG. 3a is a top prospective view of an exemplary food tray for the present food dehydrator.

FIGS. 3a and 3b are top and bottom perspective views of the food trays 24, 26, and 28, respectively. The food trays 24–28 are preferably identical. Sidewall 60 has a top edge 62 and a flared bottom edge 64. Support surface 66 includes a series of radial support members 68 and ribs 70 located on the inside perimeter of the sidewall 60. The support surface 66 is preferably an open mesh structure that permits heated air to reach the underside of food items located thereon. Alternatively, the horizontal air flow also the support surface 66 to be solid or non-porous, to permit the drying of liquid or semi-liquid materials, with no blockage of air movement. A central opening 72 is preferably located in the center of the support surface 66.

As best seen in the bottom view of FIG. 3b, the food tray 24–28 includes a series of spaced supports 72 that extend above a ridge 74 formed by the flared bottom edge 64. The spaced supports 72 are positioned to engage with the top edge 46 of the base 22 or the top edge 62 of an adjacent food tray. In the stacked configuration illustrated in FIG. 1, the flared bottom edge 64 of the food tray 24 extends around the top edge 46 of the base 22, but the spaced supports 72 prevent the ridge 74 from engaging directly with the top edge 46. Consequently, a small gap is maintained between the food tray 24 and the base 22. Similarly, the spaced supports 72 on the food trays 26–28 maintains a small gap with the food trays 24–26, respectively, when in a stacked configuration. The small gaps operate as outlet vents 150–156 (see FIG. 1).

Figure 4B:
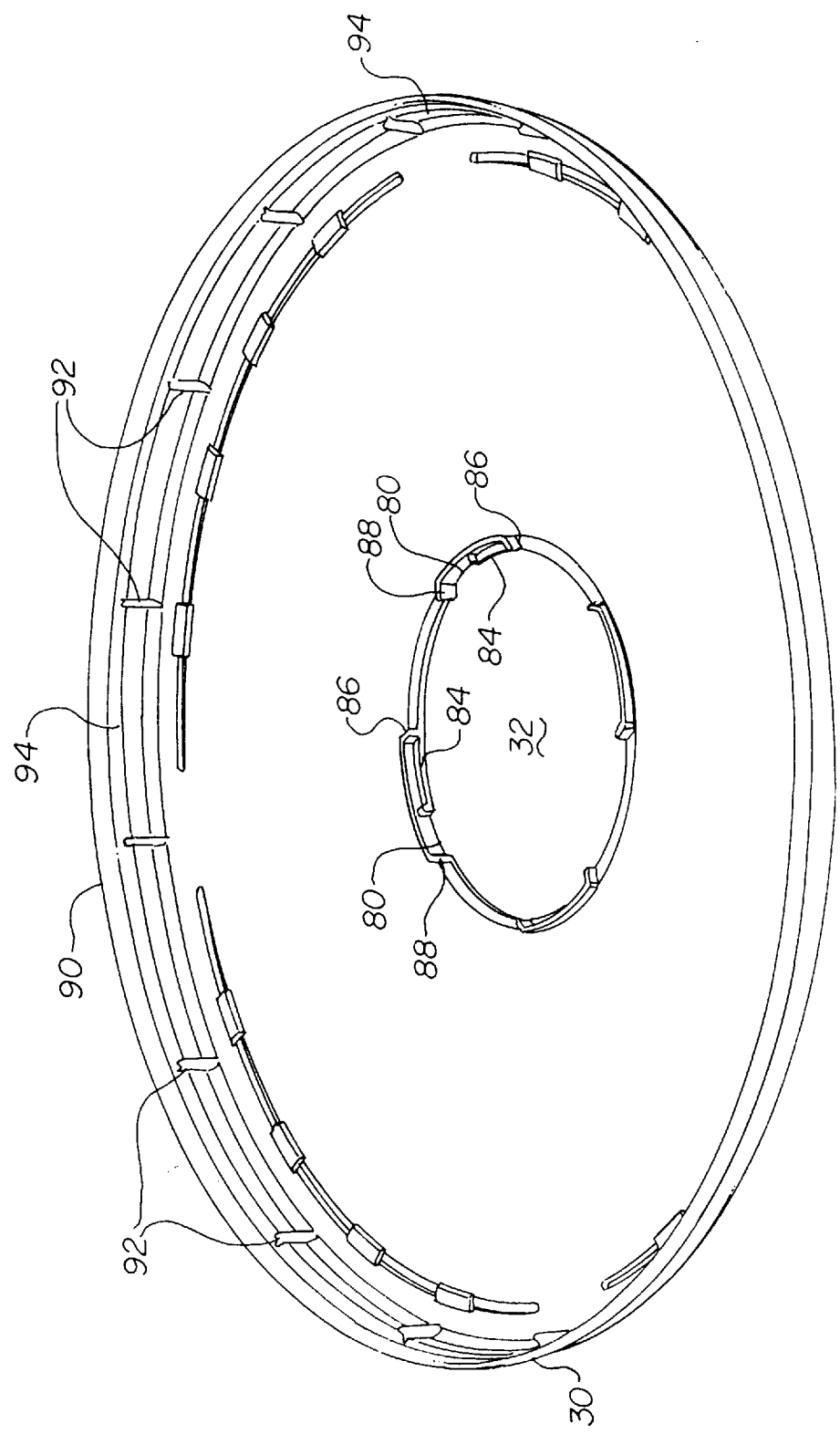

FIGS. 4a and 4b are top and bottom perspective views of the cover 30, respectively. A series of slots 80 are arranged around a perimeter 82 of the central opening 32. Portions of the perimeter 82 form ridges 84 adjacent to the slots 80 for engaging with corresponding protrusions 124 on the detachable heater blower assembly 34 (see FIG. 5). Stops 86 are located underneath the ridge 84 to limit the movement of the protrusions 124. Slide surfaces 88 are located adjacent to the slots 80 opposite the ridges 84 to facilitate engagement with the protrusions 124.

As best seen in FIG. 4b, the cover 30 has a flared bottom edge 90 with a series of space supports 92 positioned to engage with the top edge 62 of the food tray 28. The spaced supports 92 extend above a ridge 94 formed by the flared bottom edge 90 so that a small gap is formed between the ridge 94 and the top edge 62 of the food tray 28. The gap forms outlet vent 156 (see FIG. 1). In an alternate embodiment, the cover 30 may optionally include outlet vents 96 located near the flared bottom edge 90.

Figure 5:
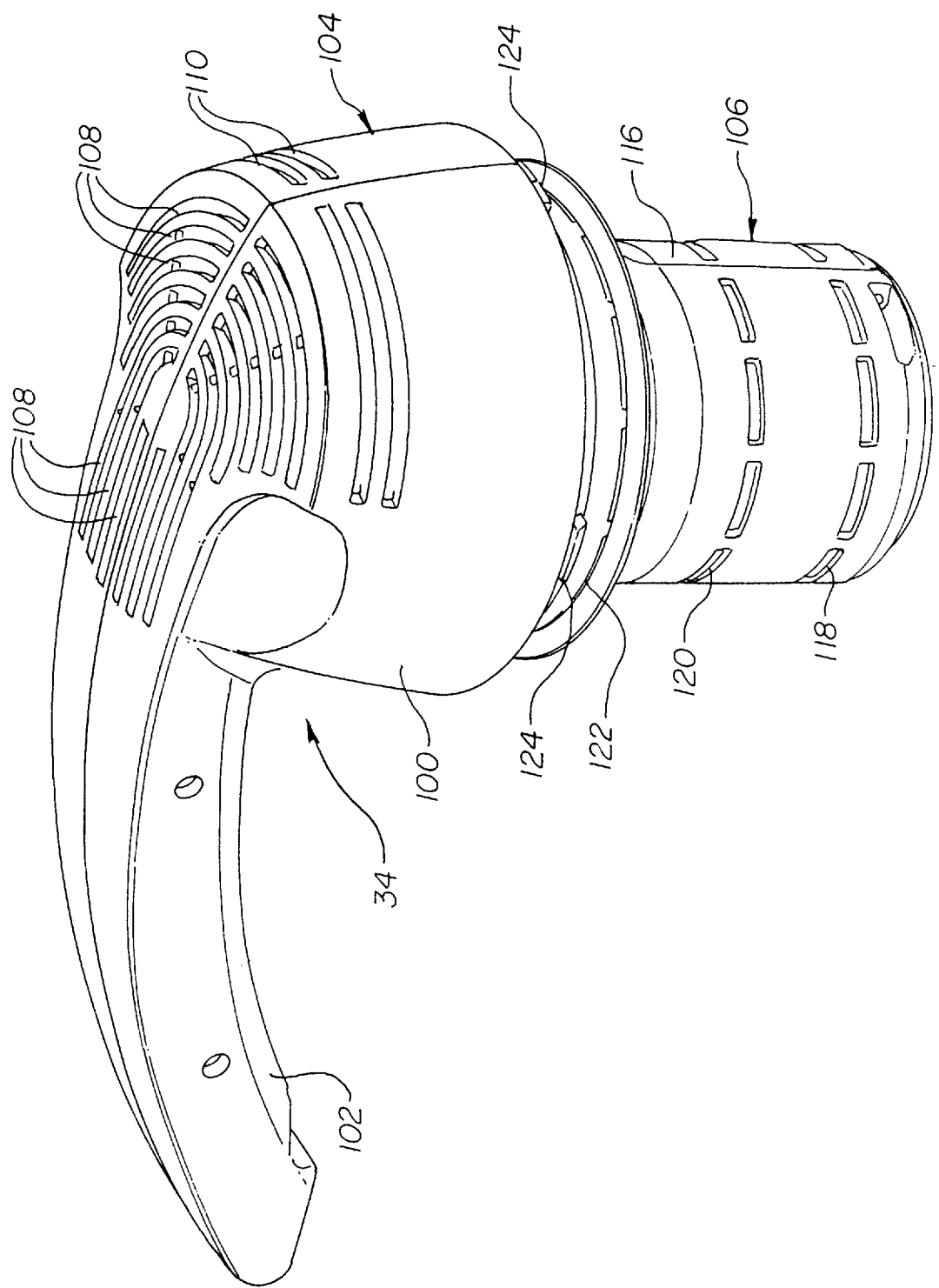
FIG. 5 is a prospective view of a heater blower assembly for the present food dehydrator.

FIG. 5 is a prospective view of the detachable heater blower assembly 34. Housing 100 includes a handle 102, a central portion 104, and an air distribution portion 106. The central portion 104 includes a series of top inlet vents 108 and side inlet vents 110 through which outside air is drawn into the detachable heater blower assembly 34. Protrusions 124 at the base of the central portion 104 are arranged for engagement with the slots 80 in the central opening 32 on the cover 30.

Figure 6:
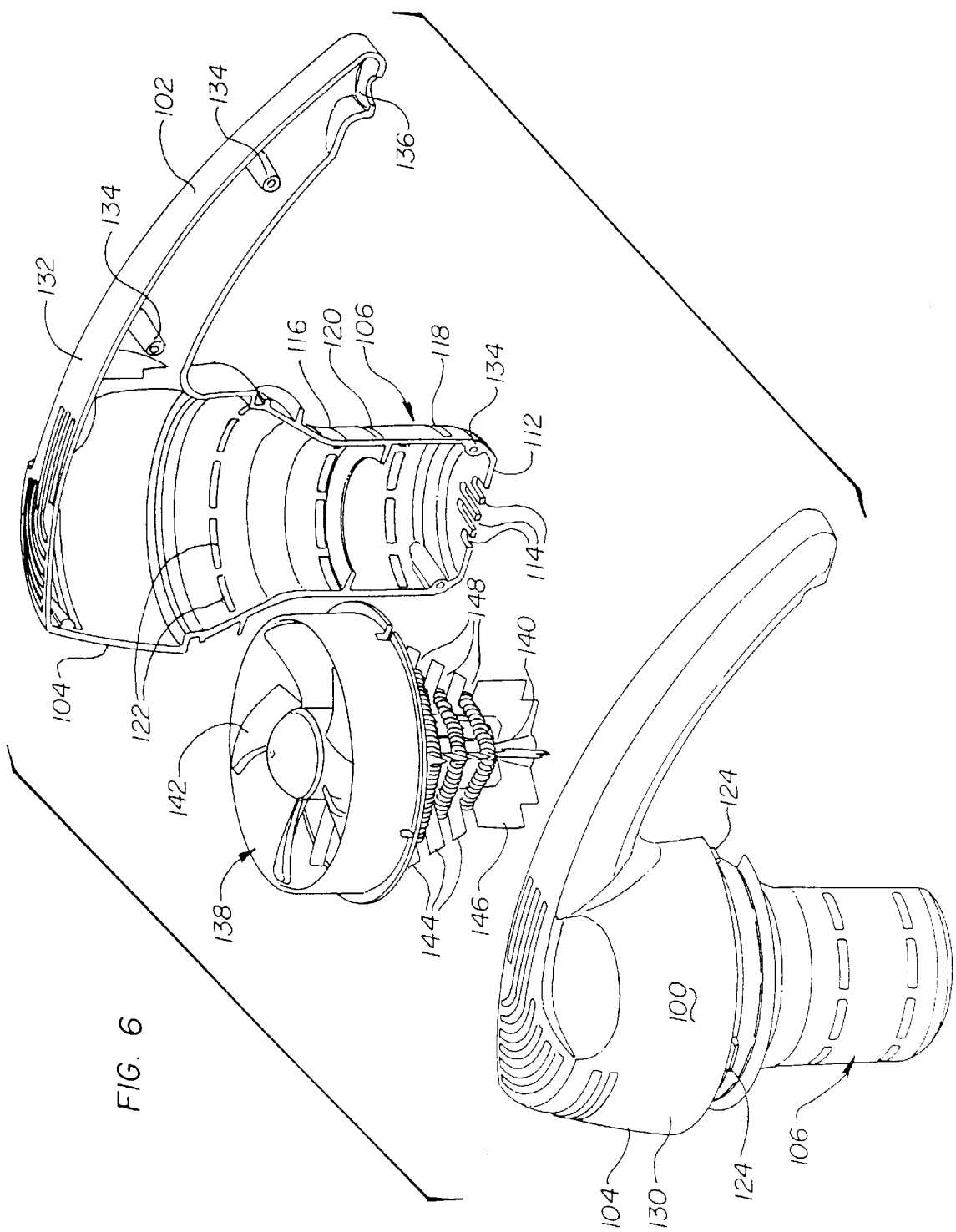
FIG. 6 is an exploded perspective view of the heater blower assembly of FIG. 5.

As illustrated in FIG. 6, bottom surface 112 of the air distribution portion 106 includes first blower ports 114. Cylindrical sides 116 of the air distribution portion 106 includes second blower ports 118 and third blower ports 120 arranged around the perimeter thereof Fourth blower ports 122 are located around the perimeter of the air distribution portion 106 near the central portion 104. The air distribution portion 106 operates as an air plenum for directing pressurized, heated air into the dehydrator module 36, preferably horizontally above and below the support surfaces 66.

The housing 100 comprises a left portion 130 and a right portion 132. The right portion 132 includes a series of holes 134 for receiving screws that engage with the left portion 130. The distal end of the handle 102 includes a power cord opening 136. A standard power cord, plug and strain relief (not shown) extends through the hollow handle 102 for engagement with a heater blower module 138. The power supply may either be connected directly or a switch (not shown) may be added to the handle.

The heater blower module 138 includes a motor 140 attached to a fan blade 142. A support structure 146 surrounds the motor 140 and securely retains it in the housing 100. A heater coil 144 is wound around a series of slots 148 on the support structure 146. The support structure 146 is preferably constructed of a high temperature material, such as phlogopite or muscovite mica. In the preferred embodiment, the support structure 146 is mica—0.81 mm (0.032) inches thick. The housing 100 is preferably constructed of a high temperature thermoplastic such as polypropylene.

The motor 140 is preferably axial with a rating of about 12 VDC driven at about 9 VDC to obtain about 4000 rpms. The heater coil 144 is preferably a resistance element having a heating capacity of about 360 watts, 120 VAC at 50–60 Hz. The heater coil 144 may be divided into two parts, so that a portion acts in series with the motor 140 and a portion acts in parallel. This configuration serves to step down the voltage to the motor so that the output temperature of the heater coil 144 is about 63° C. (145° F.). The portion of the resistance wire 144 that is in series with the motor 140 is about 37 Ohms. The portion of the resistance wire 144 that is in series is about 3.33 Ohms. It will be appreciated that these values may be adjusted for a variety of reasons, such as for example, due to adjustments in the venting or fan design. A fuse (not shown) is preferably located adjacent to the heater coil 144 to turns off the power if the temperature in the dehydrator 20 exceeds a predetermined temperature. A thermostat or thermistor may also be used to maintain a target temperature within the dehydrator.

Figure 7:
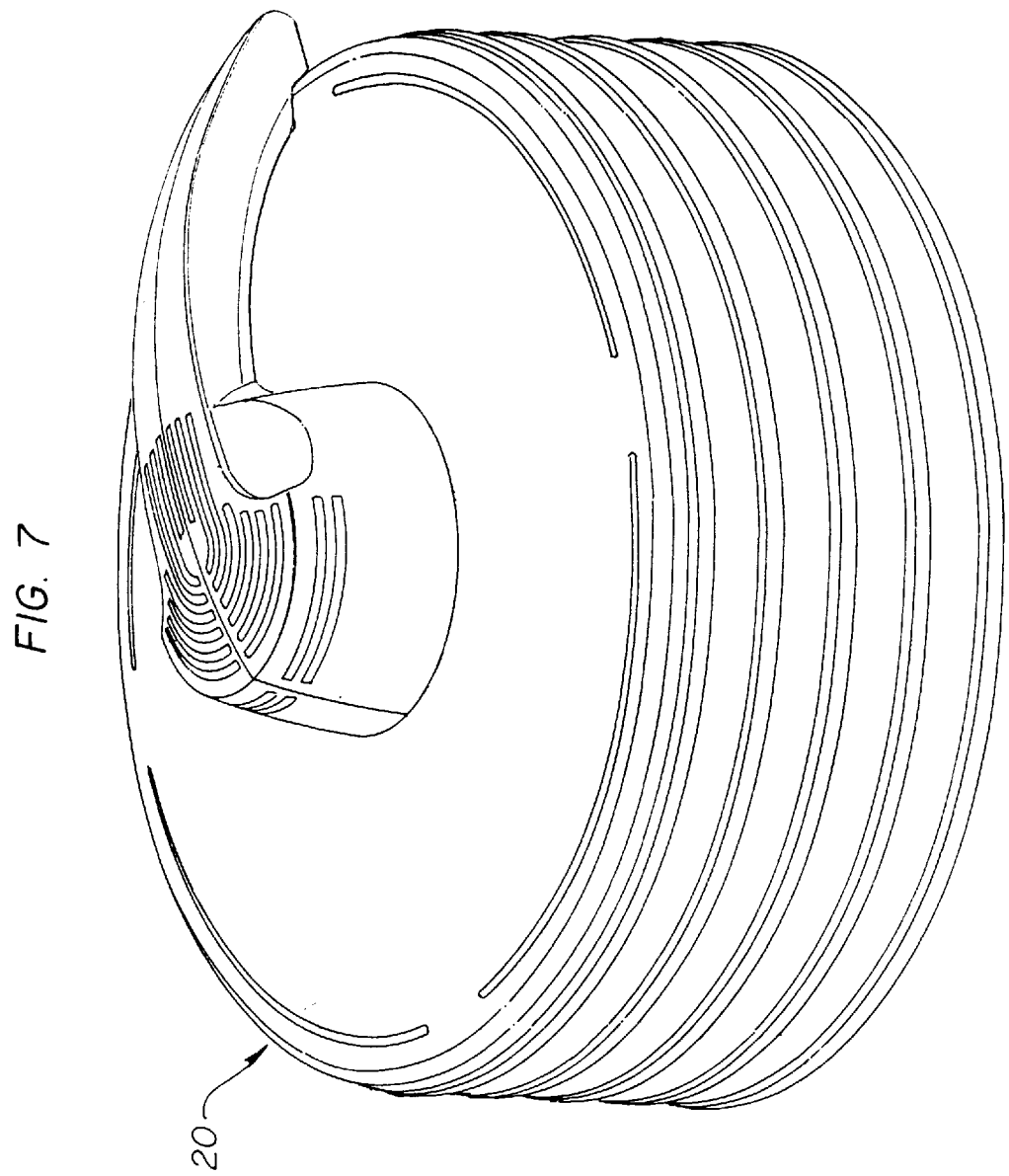
FIG. 7 is a prospective view of the present food dehydrator.
Figure 8A:
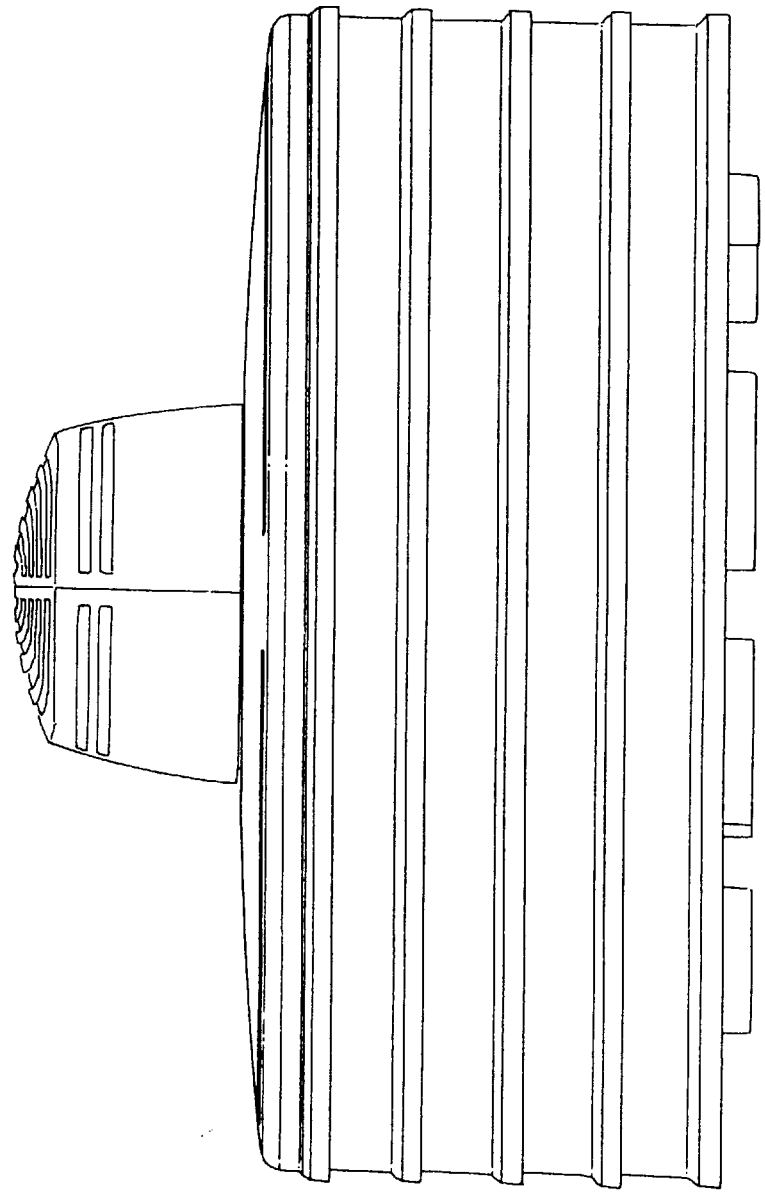
FIG. 8a is a front view of the food dehydrator of FIG. 7.
Figure 8B:
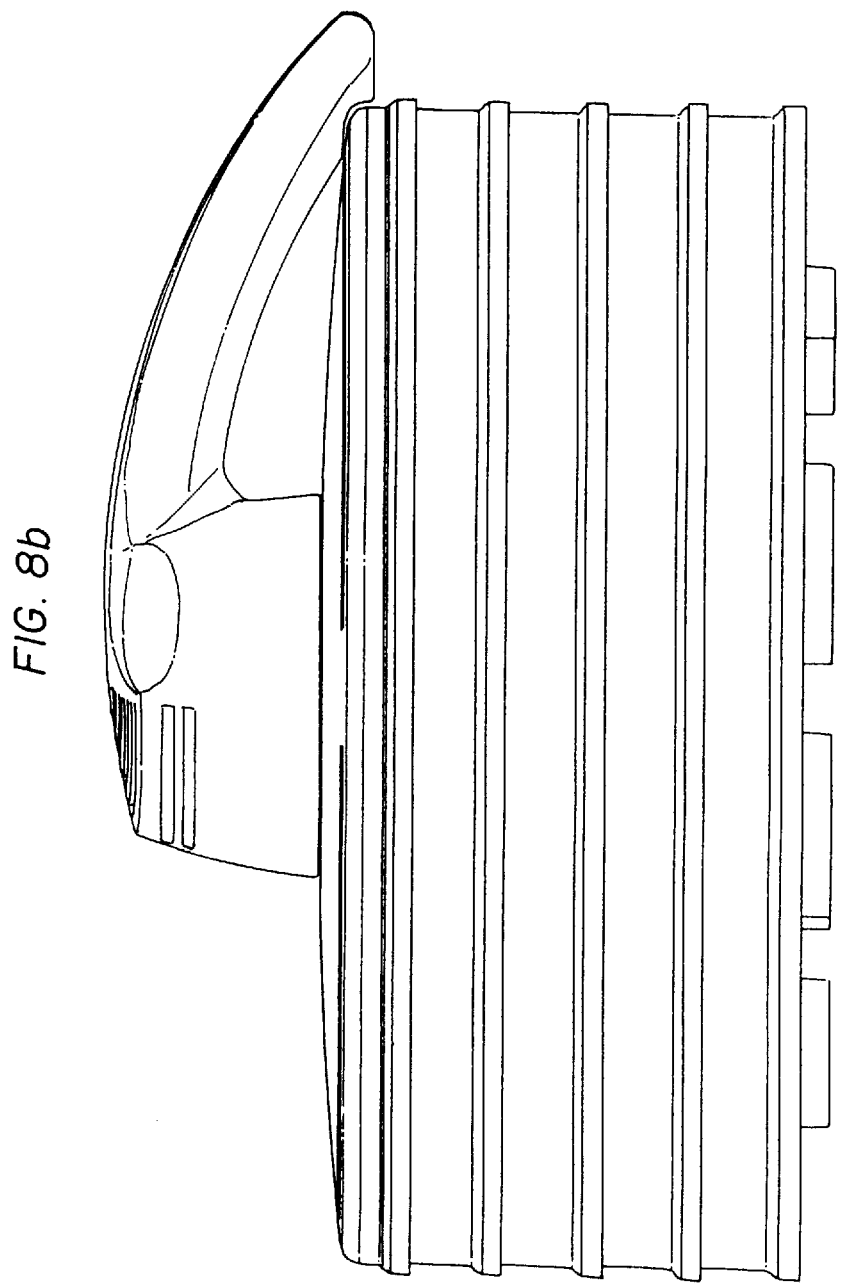
FIG. 8b is a side view of the food dehydrator of FIG. 7.
Figure 8C:
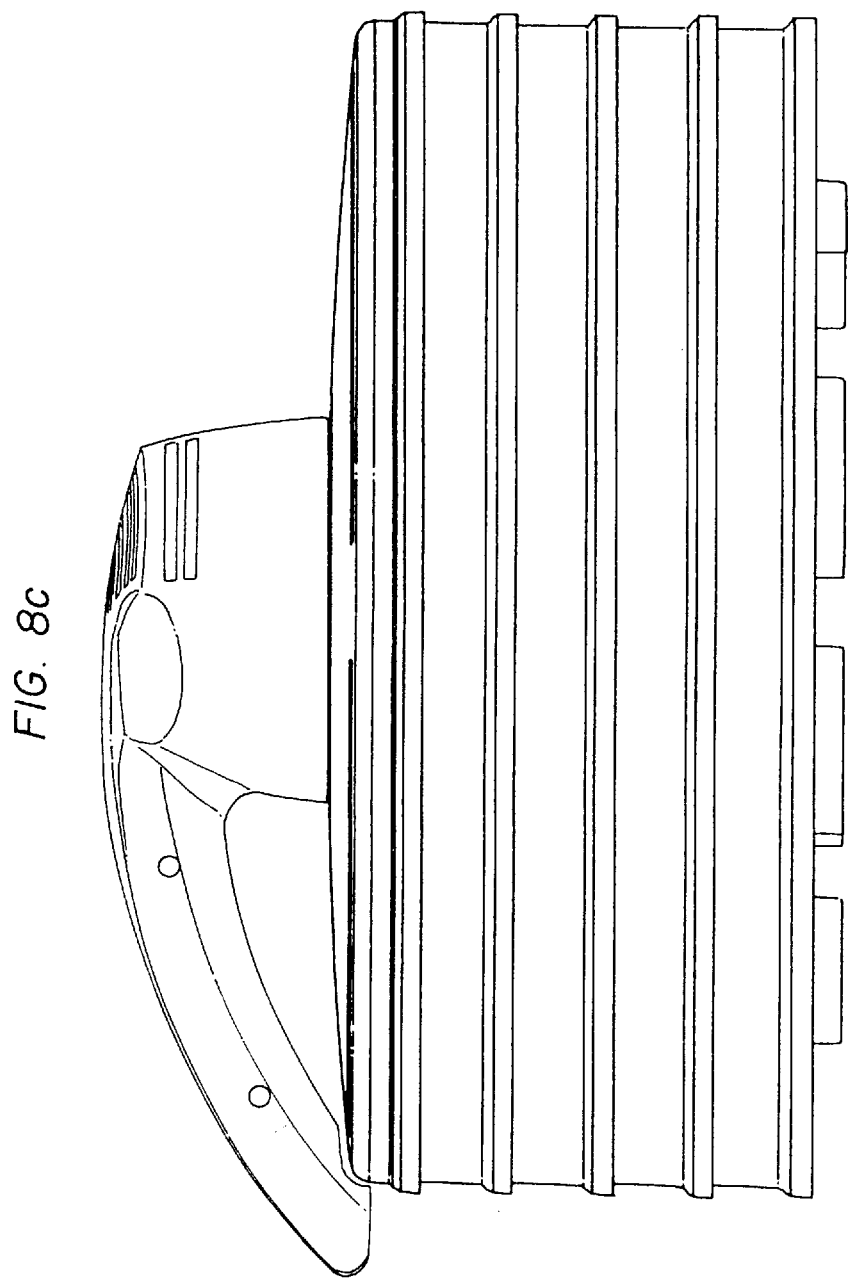
FIG. 8c is a side view of the food dehydrator of FIG. 7.
Figure 8D:
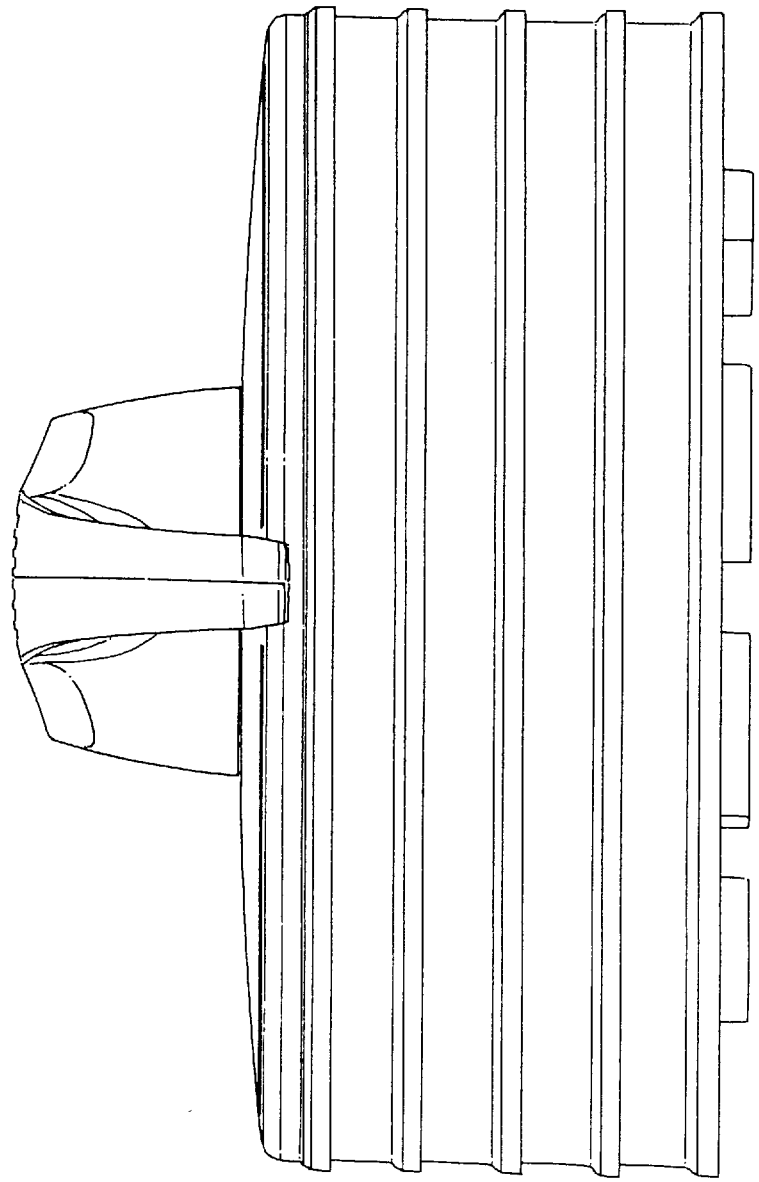
FIG. 8d is a rear view of the food dehydrator of FIG. 7.
Figure 8E:
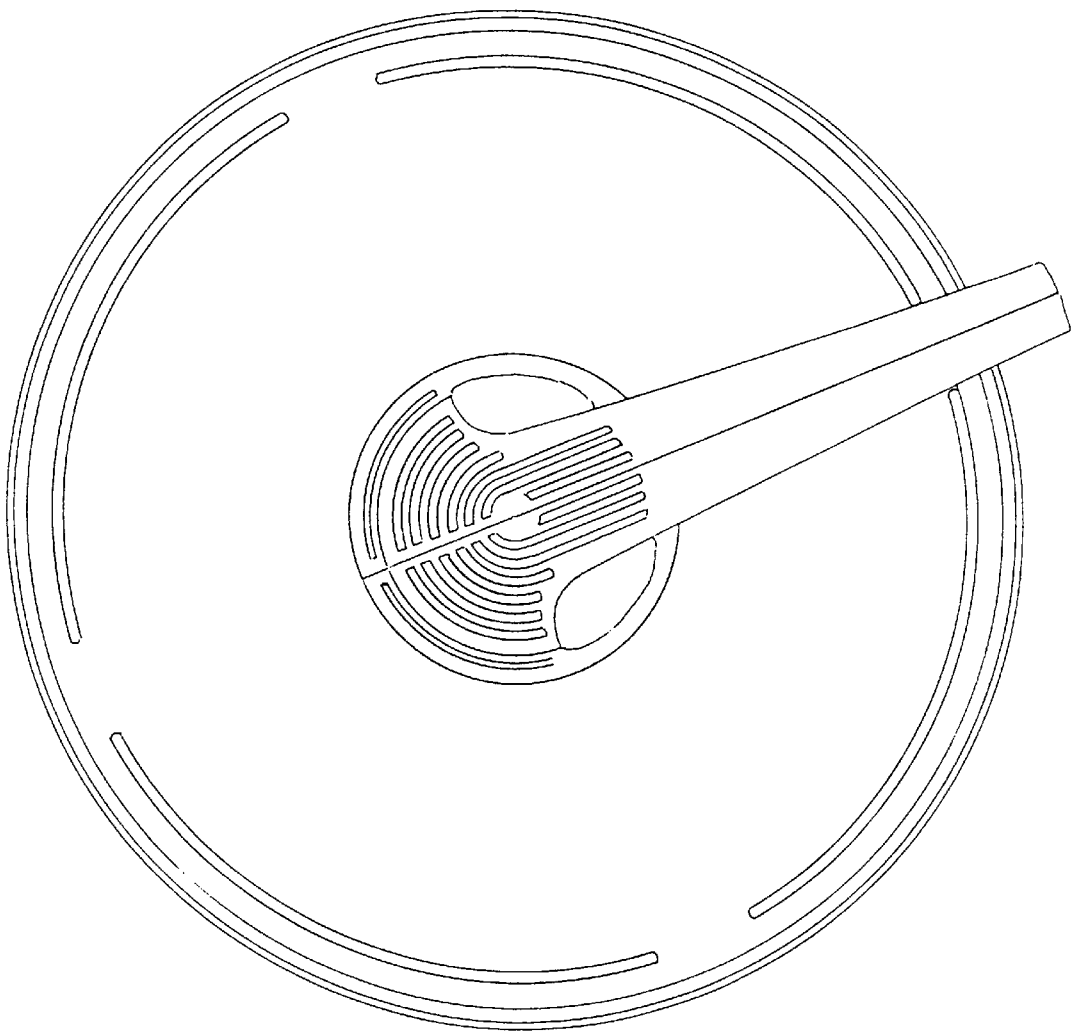
FIG. 8e is a top view of the food dehydrator of FIG. 7.
Figure 8F:
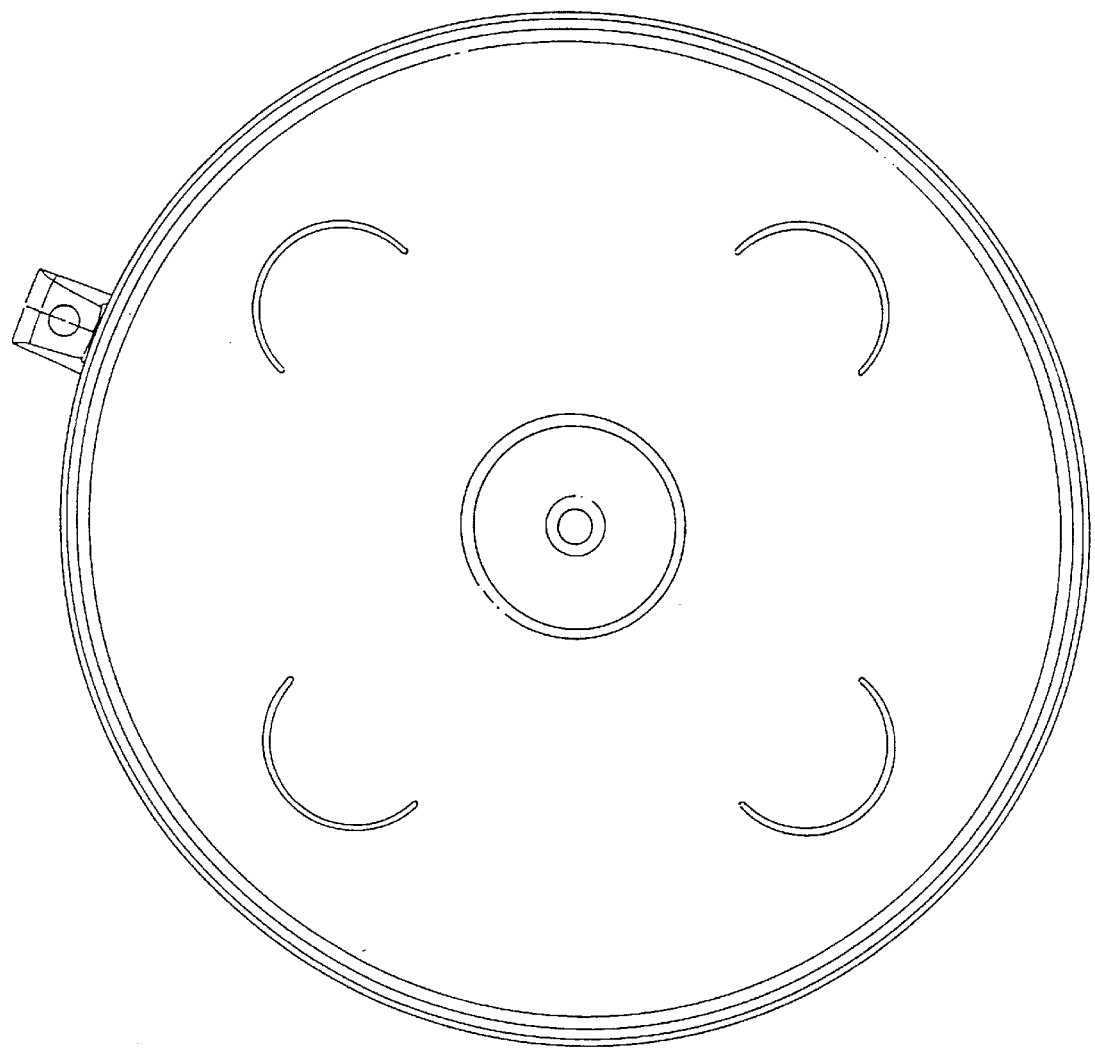
FIG. 8f is a bottom view of the food dehydrator of FIG. 7.

FIG. 7 is a perspective view of the present food dehydrator 20. FIGS. 8a through 8f are plan views of the food dehydrator of FIG. 7. The food dehydrator 20 is about 30.5 cm (12 inches) in diameter and about 19.05 cm (7.5 inches) high. The heater blower assembly 34 extends about 6.35 cm (2.5 inches) above the cover 30.

As is best illustrated in FIGS. 1a and 1b, the detachable heater blower assembly 34 is engaged with the dehydrator module 36 by inserting the air distribution portion 106 through the central opening 32 of the cover 30. The air distribution portion extends downward through the central openings 72 of the food trays 24–28. The protrusions 124 on the central portion 104 are aligned with, and inserted into, the slots 80 on the cover 30. The detachable heater blower assembly 34 is then rotated counterclockwise so that the protrusions 124 slide along the bottom of the ridges 84 until they engage with stops 86. Slide surfaces 88 prevent the heat detachable heater blower assembly from rotating in the clockwise direction.

When the detachable heater blower assembly 34 is fully engaged with the dehydrator module 36, the first blower ports 114 are positioned above the flow diverter 50 so that heated air 114a is directed across the floor 42 of the base 22 and along the bottom surface of the support surface 66 of food tray 24 (see FIG. 5 and 6). The second blower ports 118 are positioned to direct heated air 118a across the top of the support 66 of the food tray 24 and the bottom of the support surface 66 of the food tray 26. The third blower ports 120 are positioned to direct heated air 120a across the top of the support surface 66 of the third food tray 26 and the bottom of the support surface 66 of the fourth food tray 28. The fourth blower ports 122 are positioned to direct heated air 122a across the support surface 66 of the food tray 28. The air distribution portion divides the heated air into separate portions. The blower ports 114, 118, 120, 122 preferably divide the heated air into equal portions so that each tray 22–28 received a generally equal quantity of air at generally equal velocities.

As discussed above, the spaced supports 72 engage with the top edge 46 of the base 22 so that a first outlet vent as indicated by the arrow 150 is formed around the perimeter of the sidewall 44. Similarly, outlet vents indicated by arrows 152, 154, and 156 are formed around the perimeter of the sidewall 60 of the food trays 24–28, respectively. Alternatively, outlet vents 96 formed directly in the cover 30 may supplement and/or may be substituted for the outlet vent 156 (see FIG. 4a).

Locating the heater blower module 138 close to the center food trays 22–28 provides for the shortest path to the food and minimizes loss in air velocity and heat. Heat generated by the motor 140 is also retained within the dehydrator module 36. There is only one right angle bend in the air flow before the heated air reaches the food, minimizing velocity losses. Additionally, the heated air passes over only one of the trays 22–28 before it exits through one of the outlet vents 150–156, minimizing the contact of moist air with the food items.

FIG. 9 is an exploded side sectional views of an alternate food dehydrator 200 of the present invention. The food dehydrator 200 includes a dehydrator module 202 and a detachable heater blower assembly 204. The dehydrator module 202 includes a base 206 on which may be stacked a series of food trays 208, 210 and 212. A cover 216 extends across the top of the food tray 212. The detachable heater blower assembly 204 extends downward through a central opening 218 in the cover 216 and central openings 220 in the food trays 212. In an alternate embodiment, the heater blower assembly 204 is permanently attached to the dehydrator module 202, as discussed above.

The cover 216 includes an inner wall 222 that defines an air duct 224. Similarly, an air duct 226 is defined between inner walls 228 and outer walls 230 around the perimeter of the food trays 208–214. The inner walls 228 and outer walls 230 may be connected by a variety of supports (not shown) that provide minimal resistance to air flow through the air duct 226, such as disclosed in U.S. Pat. No. 5,423,249 (Meyer). When in the stacked configuration illustrated in FIG. 10, the air duct 224 is in fluid communication with the air duct 226. The inner walls 228 are preferably shorter than the outer walls 230 to form a plurality of blower ports 270, 272, 274, 276 around the outer perimeter of the support surfaces 234 for directing the heated air flow radially inward. In an alternate embodiment, the inner walls 230 may include a plurality of perforations that function as blower ports. See generally, U.S. Pat. Nos. 4,190,965 (Erickson); 4,224,743 (Erickson et al.); 4,536,643 (Erickson); 5,420,393 (Dornbush et al.); 5,423,249 (Meyer).

The support surfaces 234 extend from the inner walls 228 to a hub-like walls 240 at the center of the food trays 208–214. The hub-like walls 240 serve to form an inner duct 244. The hub-like walls 240 include a plurality of slots 242 in fluid communication with the inner duct 244.

The detachable heater blower assembly 204 includes a housing 250 with a series of top inlet vents 252 and side inlet vents 254 through which outside air is drawn into the detachable heater blower assembly 204 (see FIG. 10). Protrusions 256 are arranged for engagement with corresponding slots (not shown) in the central opening 118 on the cover 216. At the base of the housing 250 is an air distribution portion 258 that directs heated air into the air ducts 224 and 226.

The heater blower module 260 includes a motor 262 attached to a fan blade 264. A support structure 266 surrounds the motor 262 and securely retains it in the housing 250. A heater coil 268 is supported by a series of slots 270 on the support structure 266. The support structure 266 is preferably constructed of a high temperature material, such as phlogopite or muscovite mica.

FIG. 10 illustrates a food dehydrator 200' that is a variant of the food dehydrator 200. The food dehydrator 200' includes a fourth food tray 214 to emphasize that the design of the flow path in the food dehydrator 200 is independent of the number of food trays utilized. The food dehydrators 200, 200' are the same in all other respects and common reference numeral are used.

As best illustrated in FIG. 10, when the detachable heater blower assembly 204 is fully engaged with the dehydrator module 202, the first blower port 270 directs heated air 270a across the top of the support surface 234 of the food tray 208 and along the bottom of the support surface 234 of the food tray 210. The second blower port 272 direct heated air 272a across the top of the support surface 234 of the food tray 210 and along the bottom of the support surface 234 of the food tray 212. The third blower port 274 direct heated air 274a across the top of the support surface 234 of the food tray 212 and along the bottom of the support surface 234 of the food tray 214. The fourth blower port 276 direct heated air 276a across the top of the support surface 234 of the food tray 214. When the trays 208–214 are stacked together, the air duct 226 forms a continuous pressurized plenum chamber surrounding the trays and extending substantially from the top to the bottom of the dehydrator module 202. Due to the generally uniform pressure distribution within the air duct 226, blower ports 270–276 preferably divide the heated air into equal portions so that each tray 208–214 received a generally equal quantity of air at generally equal velocities.

The heated air 270a–276a then flows through the slots 242 into the inner duct 244. The heated air 270a–276a is exhausted to the environment through an outlet vent 278 in the bottom of the base 206. Legs 280 on the base 206 maintain an air gap that permits the free flow of the heated air 270a–276a. A portion of the heated air 270a–276a is preferably drawn back into the air duct 224 through an opening 282 by a Bernoulli effect. In particular, the relatively high air velocity through the heater blower assembly 204 to the air duct creates a low pressure condition that draws or siphons air through opening 282. Permitting a portion of the heated air to be recirculated, rather than being exhausted out the outlet vent 278 provides the added benefit of minimizing back pressure near the top trays 212, 214, especially if the number of food trays is increased.

The speed of food drying is influenced primarily by three factors: air moisture content, air temperature and air velocity. Supplying the heated air 270a–276a from the outer perimeter of the food trays 208–214 insures that the warmest and driest air encounters the larger surface area of the support surfaces 234 at the perimeter of the food trays 208–214. As the air cools and absorbs moisture as it moves radially inward. However, the velocity of the heated air increases as it move radially inward, compensating, in large part, for the increase moisture content and lower temperature of the air. Recirculating a portion of the heated air 270a–276a also conserves energy, since the air is already heated, although the air also has a higher moisture content.

With regard to the food dehydrators 20, 200, the total path length the air travels from the heater coils 144, 268 to the food trays 22–28, 208–214, until it is exhausted through the outlet vents 150–156, 278, is preferably about the same from tray to tray contributing to uniform heating. Moving the heated air flow horizontally over the food, rather than vertically through the trays, also provides for more uniform drying of food items from tray to tray. The horizontal air flow also permits drying of liquid or semi-liquid materials on a solid or a non-porous support surfaces 66, 234, with no blockage of air movement. The symmetrical nature of the dehydrator modules 36, 202 also contributes to even distribution of heated air and more even drying of the food.

A detachable nature of the detachable heater blower assemblies 34, 204 allows for easy storage and servicing of the food dehydrators 20, 200. It is anticipated that the relatively compact, detachable heater blower assemblies 34, 204 will be stored along with other kitchen appliances, while the more robust and bulkier trays 22–28; 208–214 can be stored in another area without concern over dirt and moisture. Once the detachable heater blower assemblies 34, 204 are removed from the dehydrator modules 36, 202 all remaining components are dishwasher safe and can be fully immersed in water.

EXAMPLE

The dehydrating performance of the food dehydrator substantially shown in FIG. 1 (Ex. 1), utilizing outlet vents 96 in the cover rather than the outlet vents 156, was compared to four comparative units, as set forth in Table 1 below. C1 was the model FD-20 and C2 was the model FD-50, both available from American Harvest, Inc. of Chaska, Minn. C3 was the model FD15 available from Mr. Coffee of Bedford Heights, Ohio. C4 was from Ronco of Beverly Hills, Calif. The range, average drying times and system specifications for C1–C4 were taken from the instruction manuals and/or cook books provided with each of the units.

TABLE 1

|  | Example 1 | C1 | C2 | C3 | C4 |
|---|---|---|---|---|---|
| Fan | Yes | Yes | Yes | Yes | No |
| Thermostat | No | No | Yes | No | No |
| Number of Trays | 4 | 4 | 4 | 5 | 4,5 |
| Wattage | 360 | 300 | 550 | 260 | 60/80 |
| Operating Temp. | 145 | 145–150 | 95–147 | 151–166 | 150–153 |
| Drying Time in hours (Average) | | | | | |
| Fruit Rolls (Average) | (6.5 hours) | 8–12 hours (10 hours) | 4–8 hours (6 hours) | 8–15 hours (11.5 hours) | 24–36 hours (30 hours) |
| Jerky (Average) | (7.0 hours) | 4–15 hours (9.5 hours) | 4–15 hours (9.5 hours) | 8–15 hours (11.5 hours) | 24–48 hours (36 hours) |
| Apples (Average) | (6.5 hours) | 8–12 hours (10 hours) | 4–8 hours (6 hours) | 4–15 hours (9.5 hours) | 24–48 hours (36 hours) |
| Bananas (Average) | (5.9 hours) | 12–16 hours (14 hours) | 6–10 hours (5.5 hours) | 8–36 hours (22 hours) | 24–36 hours (30 hours) |
| Pineapples (Average) | (6.5 hours) | 12–20 hours (16 hours) | 8–12 hours (6 hours) | 8–20 hours (14 hours) | 24–72 hours (48 hours) |
| Tomatoes (Average) | (10.8 hours) | 10–14 hours (12 hours) | 8–12 hours (10 hours) | 6–20 hours (13 hours) | 36–72 hours (54 hours) |

The performance of C4 is significantly less than Ex. 1 and C1–C3 since C4 does not include a fan and has a heating element with 60–80 watts of power. Additionally, C4 required rotation of the tray to achieve acceptable levels of drying uniformity.

Reference should be made to the wattage of the respective units. The heating element of Ex. 1 is 34.5% less powerful than that of C2. Yet, average drying times for the listed food items are only about 8.0% longer for Ex. 1 than for C2. Similarly, the wattage of Ex. 1 is only 20% more powerful than that of C1. Yet, the dehydrator of Ex. 1 dried the food items significantly faster, as set forth in table 2 below.

TABLE 2

| Food item | Percentage reduction in drying time using Ex. 1 as compared to C1 |
|---|---|
| Fruit Rolls | 45% |
| Jerky | 26% |
| Apples | 45% |
| Bananas | 58% |
| Pineapples | 59% |
| Tomatoes | 10% |

It is believed that the recessed nature of the detachable heater blower assembly and the short flow path of heated air across the food trays permits usage of a lower wattage heating element while providing comparable performance to prior art dehydrators having higher wattage heating elements.

Patents and patent applications disclosed herein are hereby incorporated by reference. Other embodiments of the invention are possible. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A food dehydrator comprising:
    a dehydrator module comprising an enclosure containing a plurality of generally horizontal support surfaces, the dehydrator module including an opening extending generally vertically through the support surfaces; and
    a heater blower assembly provided on a top surface of the dehydrator module and being releasably attachable to the dehydrator module, the heater blower assembly comprising a motor driven fan, a heating element and an air distribution assembly, a portion of the air distribution assembly extending into the opening of the dehydrator module for directing pressurized, heated air generally across the support surfaces.

2. The apparatus of claim 1 wherein the opening of the dehydrator module constitutes a central opening extending generally vertically through the support surfaces in fluid communication with the heater blower assembly for directing heated air radially outward across the plurality of support surfaces.

3. The apparatus of claim 2 wherein the dehydrator module comprises outlet vents on an outer perimeter surface for exhausting the heated air.

4. The apparatus of claim 3 comprising at least one outlet vent located between each of the plurality of support surfaces.

5. The apparatus of claim 1 wherein the dehydrator module comprises air ducts on an outer perimeter surface in fluid communication with the heater blower assembly for directing heated air radially inward across the plurality of support surfaces.

6. The apparatus of claim 5 wherein the opening of the dehydrator module constitutes a central opening extending generally vertically through the support surfaces in fluid communication with a space provided between each the support surfaces for exhausting heated air.

7. The apparatus of claim 1 further comprising securing means for releasably attaching the heater blower assembly to the dehydrator module in an engaged configuration.

8. A food dehydrator comprising:
a dehydrator module comprising an enclosure containing a plurality of support surfaces and a central aperture extending generally vertically through the support surfaces; and
a heater blower assembly comprising a motor driven fan, a heating element, an air distribution assembly for directing heated air to the support surfaces, and a handle for facilitating user installation and removal of the heater blower assembly respectively into and from the dehydrator module.

9. The apparatus of claim 8 wherein the central aperture cooperates in fluid communication with the heater blower assembly to direct heated air radially outward and generally horizontally across the plurality of support surfaces.

10. The apparatus of claim 9 wherein the dehydrator module comprises outlet vents on an outer perimeter surface for exhausting the heated air.

11. The apparatus of claim 8 wherein the dehydrator module comprises air ducts on an outer perimeter surface in fluid communication with the heater blower assembly for directing heated air radially inward generally horizontally across the plurality of support surfaces.

12. The apparatus of claim 11 wherein the central aperture extends generally vertically through the support surfaces so as to be in fluid communication with a space provided between each the support surfaces for exhausting heated air.

13. A food dehydrator comprising:
a dehydrator module comprising a base, a cover, and a side wall forming an enclosure containing a plurality of support surfaces, the side wall having a plurality of outlet vents, the cover and support surfaces having central openings defining a central cavity; and
a top mountable heater blower assembly comprising a motor driven fan and a heating element disposed in a housing having a handle provided thereon, the housing being releasably attachable to the dehydrator module by use of the handle and having air inlet vents located above the cover and blower ports on an air distribution portion extending downward into the central cavity so that outside air is capable of being draw in through the air inlet vents to the heating element and pressurized, heated air is capable of being directed through the blower ports axially outward across the support surfaces, at least a portion of the heated air being exhausted to the atmosphere through the outlet vents.

14. A food dehydrator comprising:
a heater blower assembly comprising a motor driven fan and a heating element located in a housing, the housing including a handle and having air inlet vents on a central portion through which outside air can be drawn toward the heating element and blower ports on an air distribution portion through which heated air can be directed; and
a dehydrator module comprising;
a base;
at least one food tray having a support surface with a central opening for receiving the air distribution portion, the food tray capable of stacking vertically with the base so that an outlet vent is formed between the base and the food tray when in a stacked configuration; and
a cover capable of stacking vertically with the food tray, the cover having a central opening for receiving the air distribution portion;
wherein detachable attachment of the heater blower assembly through use of the handle by a user permits the air distribution portion to extend downward through the central openings in the cover and the food tray so that the blower ports are positioned to direct pressurized, heated air axially outward across the support surface of the food tray, at least a portion of the heated air being exhausted to the atmosphere through the outlet vent.

15. The apparatus of claim 14 wherein the air distribution portion comprises:
first blower ports for directing heated air axially outward across a floor of the base and across a bottom surface of the support surface; and
second blower ports for directing heated air axially outward across a top surface of the support surface.

16. The apparatus of claim 15 wherein the base further comprises a flow diverter below the first blower ports.

17. The apparatus of claim 14 wherein the cover further comprises outlet vents along an outer perimeter thereof.

18. The apparatus of claim 14 further comprising an outlet vent formed between the cover and the food tray.

19. The apparatus of claim 14 wherein the cover comprises:
a side wall having a flared bottom edge; and
spaced supports along an inside perimeter of the flared bottom edge, the spaced supports capable of forming a gap between a top edge of the food tray and the flared bottom edge when in a stacked configuration.

20. The apparatus of claim 14 wherein the food tray comprises:
a side wall having a flared bottom edge; and
spaced supports along an inside perimeter of the flared bottom edge, the spaced supports capable of forming a gap between a top edge of the base and the flared bottom edge when in the stacked configuration.

21. The apparatus of claim 14 wherein the at least one food tray comprises a plurality of vertically stackable food trays having outlet vents formed therebetween in a stacked configuration.

22. The apparatus of claim 14 wherein the support surface comprises a plurality of spaced support members forming an open mesh structure.

23. The apparatus of claim 14 wherein the dehydrator module comprises a material that is dishwasher safe.

24. The apparatus of claim 14 wherein the dehydrator module comprises a material that is immersible in water.

25. A kit for assembling a food dehydrator comprising:
a heater blower assembly comprising a motor driven fan and a heating element located in a housing, the housing having air inlet vents on a central portion through which outside air can be drawn toward the heating element and blower ports on an air distribution portion through which heated air can be directed; and
a base;
a first food tray having a support surface with a central opening for receiving all or a portion of the air distribution portion, the first food tray capable of stacking vertically with the base so that an outlet vent is formed between the base and the first food tray when in a stacked configuration;
at least a second food tray having a support surface with a central opening for receiving all or a portion of the air distribution portion, the second food tray capable of stacking vertically with the first food tray so that an outlet vent is formed between the first food tray and the second food tray when in a stacked configuration; and a cover capable of stacking vertically with one of the first or second food trays, the cover having a central opening for receiving the air distribution portion;

wherein detachable attachment of the heater blower assembly by a user permits the air distribution portion to extend downward through the central openings in the cover and the food trays so that the blower ports are positioned to direct heated air axially outward across the support surfaces of the food trays, at least a portion of the heated air being exhausted to the atmosphere through the outlet vent.

26. A method of operating a food dehydrator comprising the steps of:

vertically stacking at least one food tray onto a base so that an outlet vent is formed between the base and the food tray, the food tray having a support surface with a central opening;

vertically stacking a cover on the food tray, the cover having a central opening generally concentric with respect to the central opening in the support surface;

providing a heater blower assembly comprising a motor driven fan and a heating element in a housing, the housing having air inlet vents on a central portion, blower ports on an air distribution portion, and a handle;

inserting, through use of the handle, the air distribution portion downward sequentially through the central openings in the cover and the support surface;

drawing outside air in through the air inlet vents to the heating element;

directing heated air through the blower ports axially outward across the support surface of the food tray and venting at least a portion of the heated air to the atmosphere through the outlet vent; and withdrawing, through use of the handle, the air distribution portion of the heater blower assembly from the central openings in the cover and the support surface upon completion of food dehydrator usage.

* * * * *